J. H. & I. E. BEDELL.
SECTIONAL CUSHION TIRE.
APPLICATION FILED SEPT. 19, 1912.
1,089,897.
Patented Mar. 10, 1914.
2 SHEETS—SHEET 2.
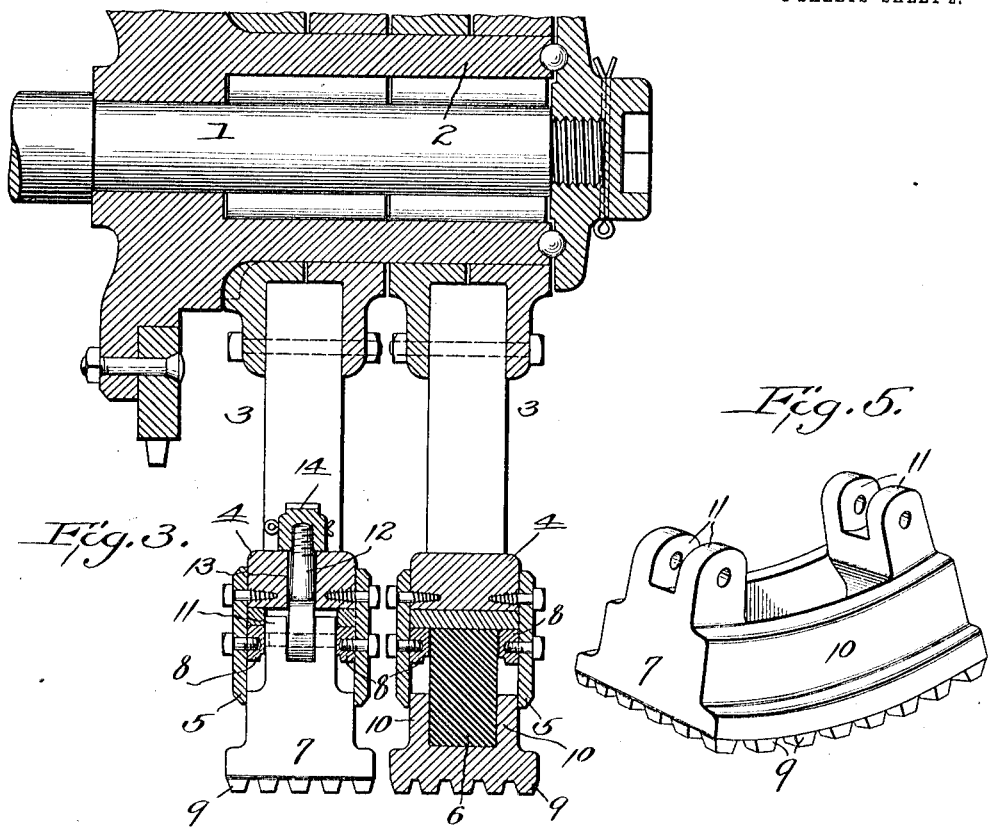
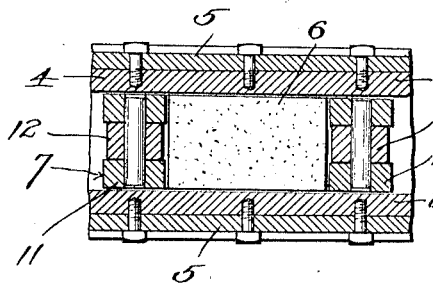
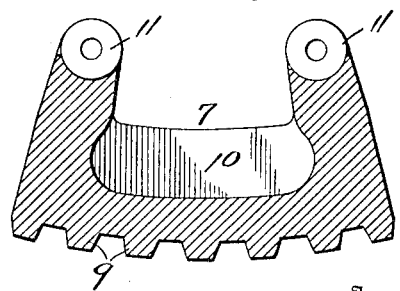
Witnesses
Olwin W. Holmes
E. B. McBath
Inventor
J. H. Bedell
I. E. Bedell
By Chas. E. Brock
Attorney

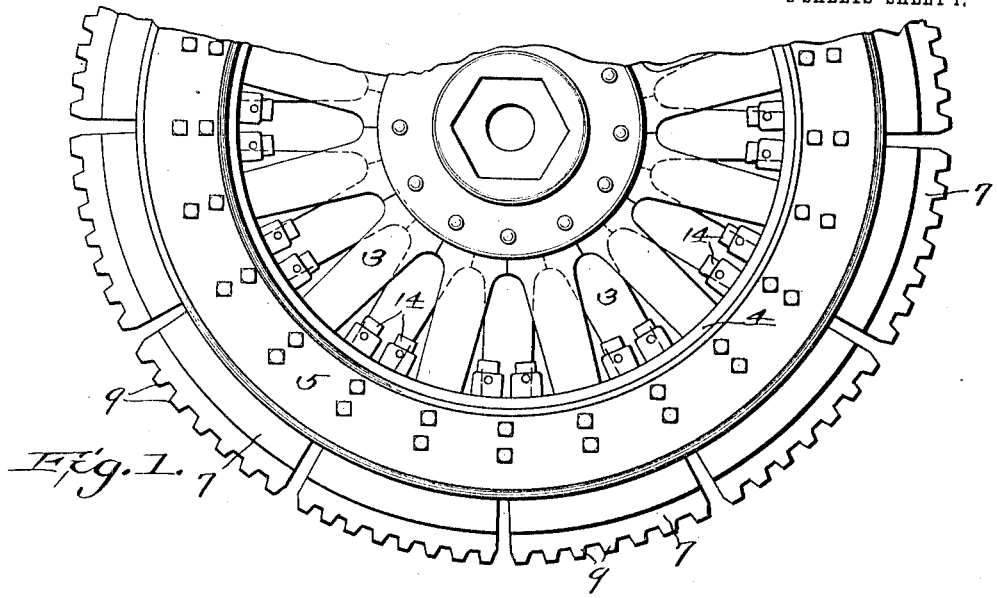
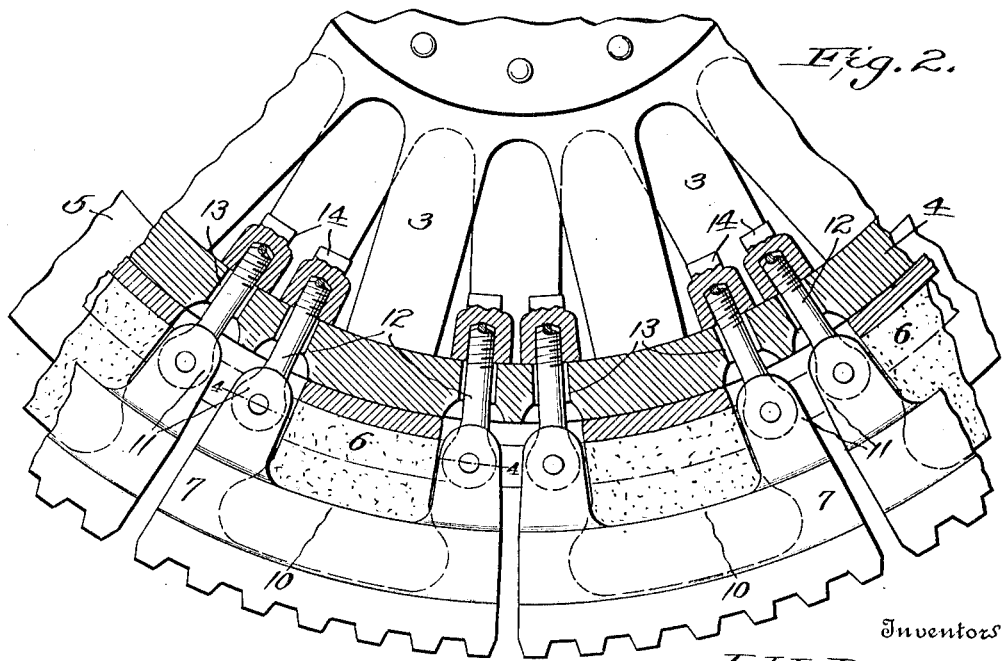

UNITED STATES PATENT OFFICE.

JAMES H. BEDELL AND ISAAC E. BEDELL, OF STAMFORD, CONNECTICUT.

SECTIONAL CUSHION-TIRE.

1,089,897.

Specification of Letters Patent.  Patented Mar. 10, 1914.

Application filed September 19, 1912. Serial No. 721,228.

*To all whom it may concern:*

Be it known that we, JAMES H. BEDELL and ISAAC E. BEDELL, citizens of the United States, residing at Stamford, in the county of Fairfield and State of Connecticut, have invented a new and useful Improvement in Sectional Cushion-Tires, of which the following is a specification.

This invention relates to a vehicle wheel, and is especially adapted for application to the wheels usually employed upon heavy auto trucks.

In constructing a wheel of this kind, we provide the same with a plurality of steel faced segments extending circumferentially around the wheel rim and said segments work against the elastic packing suitably housed between said segments and the wheel rim, the segments being so constructed and attached that they have a limited play under contact pressure, the said segments having a radial movement toward the center of the wheel when under contact pressure, each segment being returned to normal position after contact with the ground by the elastic packing; suitable means being provided to attach said segments to the wheel rim, but at the same time permitting ready removal of any particular segment for the purpose of repair, re-packing or replacing with a new segment.

The invention consists of the novel features of construction and arrangement of parts hereinafter described, pointed out in the claim and shown in the accompanying drawings, in which, Figure 1 is a lower side elevation of a wheel provided with our attachment. Fig. 2 is an enlarged detail sectional view of parts shown in Fig. 1. Fig. 3 is a vertical section taken at right angles to Fig. 2. Fig. 4 is a detail section on the line 4—4 of Fig. 2. Fig. 5 is a perspective view of one of the segments. Fig. 6 is a longitudinal section through one of the segments.

In these drawings, 1 represents the spindle of the truck axle, and 2 the hub upon which we mount suitable truck wheels 3, said wheels being placed side by side as is customary in heavy trucks of this character.

It will of course be understood that the invention could be applied to a single wheel if desired, and it will also be understood that the hub and the wheel itself does not necessarily form a part of the present invention, except so far as the wheel structure must be adapted in order to apply my invention thereto.

Upon opposite sides of the wheel rim 4 are secured circular plates 5, said plates projecting a sufficient distance beyond the periphery of the wheel in order to form a housing for a suitable elastic packing material 6, and also to form a guide for the sides of the steel segments 7.

While any suitable elastic material may be employed for cushioning the segments, limiting their inward movement, returning them to normal position and absorbing vibration, we have illustrated such material as consisting of blocks of rubber. The wheel rim is of course channeled as in ordinary practice, and the rubber block fits in the wheel channel and is retained against side movement by means of metal rings 8, placed upon opposite sides of the rubber block and secured by means of suitable machine screws to the plates 5, respectively.

The steel segments 7 are provided upon their outer faces with a suitably roughened or serrated surface 9 and side and end flanges 10 and at the corners with perforated ears 11. The flanges 10 serve to form a receptacle which receives the outer portion of the rubber block 6 and they also furnish a point of sliding contact with the guide plates 5. In order to retain the segments in position suitable bolts 12 are pivoted between the ears 11, one bolt being carried by each end of the segments, and these bolts work through suitable radial openings 13 formed in the wheel rim. Caps 14 are fitted upon the inner ends of the bolts, and in order to prevent the loosening of said bolts by an ordinary wrench in the hands of an inexperienced operator we prefer to have said caps cylindrical in form.

It will be obvious from Fig. 3 that where the truck is provided with double wheels the segments upon one wheel are offset with respect to those of the other, thereby breaking joint. It will also be obvious from Fig. 2 that as each segment reaches the point of contact on the ground it will move inwardly, the bolt at that end working through the opening 13 and the packing material will be compressed, the strain being thrown upon the bolt at the opposite end. As the wheel continues to turn, the opposite end of the segment will take the contact pressure, and the bolt at said end will rest, and the strain will be shifted to the other end portion and as the wheel continues to turn and the segment is entirely relieved of ground pressure the elastic material will return all of the parts to normal position.

What we claim is:—

The combination with a wheel, of circular plates secured to the rim of the wheel and projecting beyond the rim, a plurality of segments having side and end flanges, the side flanges being slidably retained between said plates, rubber blocks fitting in said segments and bearing upon the wheel rim, rings secured upon the inner sides of said plates and bearing upon said blocks, and bolts pivotally connected to the ends of the segments and working loosely through the wheel rim.

JAMES H. BEDELL.
ISAAC E. BEDELL.

Witnesses:
ESTHER E. BEDELL,
FRANK W. FINCH.